United States Patent [19]

Rath

[11] Patent Number: 5,366,414
[45] Date of Patent: Nov. 22, 1994

[54] PREVAILING TORQUE FASTENER

[76] Inventor: Jack Rath, 9823 Kincardine Ave., Los Angeles, Calif. 90034

[21] Appl. No.: 166,237

[22] Filed: Dec. 10, 1993

Related U.S. Application Data

[60] Division of Ser. No. 26,683, Mar. 5, 1993, Pat. No. 5,302,067, which is a continuation-in-part of Ser. No. 928,849, Aug. 11, 1992, abandoned.

[51] Int. Cl.$^5$ ............................................. B21D 53/24
[52] U.S. Cl. ............................................................ 470/25
[58] Field of Search ........................ 470/18, 21, 25, 93, 470/108, 147

[56] References Cited

U.S. PATENT DOCUMENTS

| | | | |
|---|---|---|---|
| 2,754,871 | 7/1956 | Stoll | 411/283 |
| 3,065,983 | 11/1962 | Flumerfelt | 411/937.1 |
| 3,441,073 | 4/1969 | Johnson | 411/284 |
| 3,583,052 | 6/1971 | Herbenar et al. | 411/283 |
| 3,952,785 | 4/1976 | Werner | 411/282 |
| 4,422,196 | 12/1983 | Skinner | 470/25 |
| 4,509,220 | 4/1985 | Cooper et al. | 470/25 |
| 4,549,269 | 10/1985 | Lapointe et al. | 470/21 |
| 4,778,318 | 10/1988 | Jeal | 411/55 |
| 5,033,924 | 7/1991 | Cosenza | 411/282 |

FOREIGN PATENT DOCUMENTS 1101669 1/1968 United Kingdom .

Primary Examiner—Lowell A. Larson
Assistant Examiner—Thomas C. Schoeffler
Attorney, Agent, or Firm—Christie, Parker & Hale

[57] ABSTRACT

A prevailing torque fastener has a portion of the internal thread deformed from a circular cross-section to an approximately elliptical cross-section by a pair of die impressions on diametrically opposed sides of the exterior of the body. Each die impression is skewed from a plane normal to the axis of the fastener at an angle corresponding to the lead of the thread. Each die impression is made with a jaw having a central circular arc with a radius greater than the radius of the undeformed fastener. The opening between the jaws has a perimeter equal to the circumference of the undeformed fastener. Each edge of the die impression is at a predetermined elevation relative to the thread profile, preferably aligned with the crest of the thread. The location of the die impression is controlled by threading the fastener against a stop and crimping the fastener between jaws spaced a known distance from the stop.

10 Claims, 4 Drawing Sheets

PREVAILING TORQUE FASTENER

BACKGROUND

This application is a division of U.S. patent application Ser. No. 08/026,683, filed Mar. 5, 1993, now U.S. Pat. No. 5,302,067, which is a continuation-in-part of U.S. patent application Ser. No. 07/928,849, filed Aug. 11, 1992, now abandoned. The subject matter of the prior application is hereby incorporated by reference.

The present invention provides an improved internally threaded self-locking or prevailing torque fastener, in particular, a prevailing torque fastener with a deformed thread wherein the outside surface crimp or die impression follows the helix of the fastener internal thread. The external die impression has an edge adjacent a predetermined portion of the thread profile, preferably opposite the crest of the thread. The external die impressions are made by dies including a circular arc with a radius larger than the radius of the fastener.

One type of self-locking fastener is known as a prevailing torque fastener. In a prevailing torque fastener, the thread, typically the internal thread to be threaded onto a male thread is deformed for increasing the friction between the members of the fastener. The deformed thread engages the undeformed thread and the deformed portion is forced back towards the original undeformed geometry.

Existing internally threaded prevailing torque fasteners have different forms of outside diameter deformations which deform the internal thread. There are quasi-elliptical deformations or two-, three- or four-point die impressions on the outside surface. The internal threads of the fastener respond to the outside deformations to the extent that the threads themselves become severely distorted.

Prior prevailing torque fasteners of this variety have a problem due to surface damage of the mating parts when repeatedly engaged and disengaged. Specifications for prevailing torque fasteners call for a certain friction level or breakaway torque after repeated cycles of assembling and disassembling the mating members. Surface damage due to the high friction between the parts can change the desired torque levels.

Furthermore, many fasteners have corrosion resistant or lubricous coatings on the threads. The surface damage caused by the deformed threads on the prevailing torque fasteners can erode through these surface coatings and leave the fasteners subject to damage by corrosion, or further degrade the performance of the fastener in meeting the required torque standards.

It is, therefore, desirable to provide a prevailing torque fastener where the deformed thread more uniformly and reliably engages the undeformed thread, thereby providing a more readily controlled torque and minimizing wear on the engaged threads.

SUMMARY OF THE INVENTION

Thus, there is provided in practice of this invention according to a presently preferred embodiment, an internally threaded prevailing torque fastener with portion of the thread deformed from a circular cross-section to an approximately elliptical cross-section by a pair of die impressions on diametrically opposite sides of the exterior of the body. Each die impression is skewed from a plane normal to the axis of the body at an angle corresponding to the lead of the thread. An edge of the die impression is directly opposite a predetermined portion of the thread profile in the bore adjacent to the die impression.

Preferably, each die impression has a circular arc with a radius approximately equal to the radius of the exterior of the undeformed fastener. The distance from the center of the circular arc to the axis of the body is less than the radius of the undeformed body and preferably the angular extent of each circular arc subtends an angle in the range of from 65° to 100°.

BRIEF DESCRIPTION OF THE DRAWINGS

These and other features and advantages of the invention will be appreciated as the same becomes better understood by reference to the following detailed description when considered in connection with the accompanying drawings wherein.

DETAILED DESCRIPTION

Figure 1:
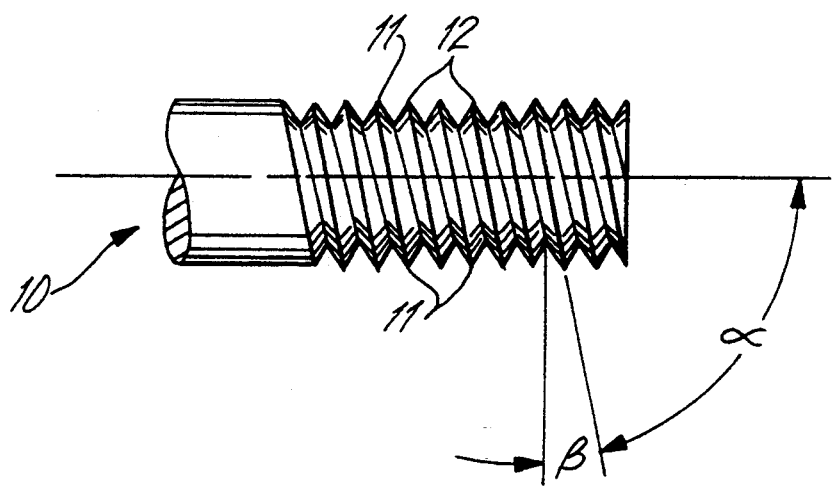
FIG. 1 illustrates a bolt or stud having a double lead thread.

As is well known, fastener threads, both external and internal, come in single and multiple leads, each of the threads following a helical path. A single lead thread has a single thread profile circling helically around the fastener with each thread profile adjacent the same thread. A double lead thread, such as the bolt or stud 10 illustrated in FIG. 1 has two thread profiles, with one thread profile 11 being parallel to the other thread profile 12, with the two threads being interleaved with each other. A double lead thread is used for advancing the threaded fastener twice as far per revolution as a single lead thread. Triple and quadruple lead threads are also known.

Figure 3:
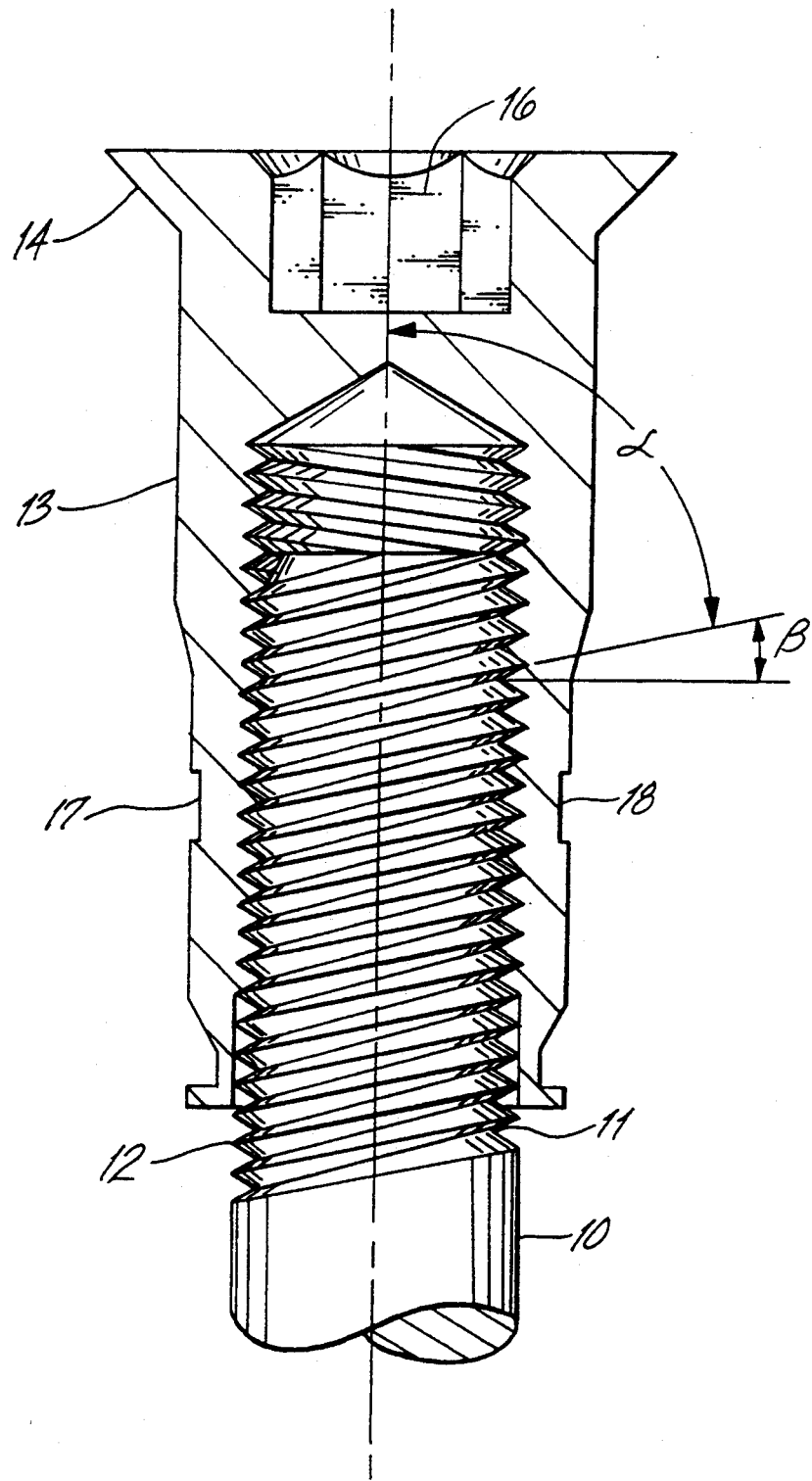
FIG. 3 illustrates a sleeve bolt threaded onto the stud of FIG. 1.

An exemplary application of a double lead thread is in fasteners for removable panels in aircraft. A plurality of male threaded studs are secured to the airframe. A removable panel is secured to the studs by hollow sleeve bolts 13, such as illustrated in FIG. 3. Such a sleeve bolt has a generally cylindrical body and a flat head 14. A hexagonal socket 16 in the end of the sleeve bolt receives an allen wrench for tightening the sleeve bolt.

When such a sleeve bolt is used on a removable aircraft panel or the like, the specifications call for minimum and maximum torque levels for removing the sleeve bolt from the stud. If the torque is below a minimum, the fastener may not remain secure and may come off the stud unintentionally. Too high a torque indicates excessive deformation of the fastener and may indicate severe wear problems. The specifications also call for the sleeve bolt to be cycled on and off of a male threaded stud at least 500 cycles for qualification and at least 25 cycles for production order acceptance tests, and still be within the specified range of torques. Other tests are used under other specifications. Surface wear in the fastener may make the threads fit too loosely and may cause the torque level to drop below the specified minimum. If surface lubrication wears away, the parts may gall and the torque levels rise unacceptably.

Figure 2:
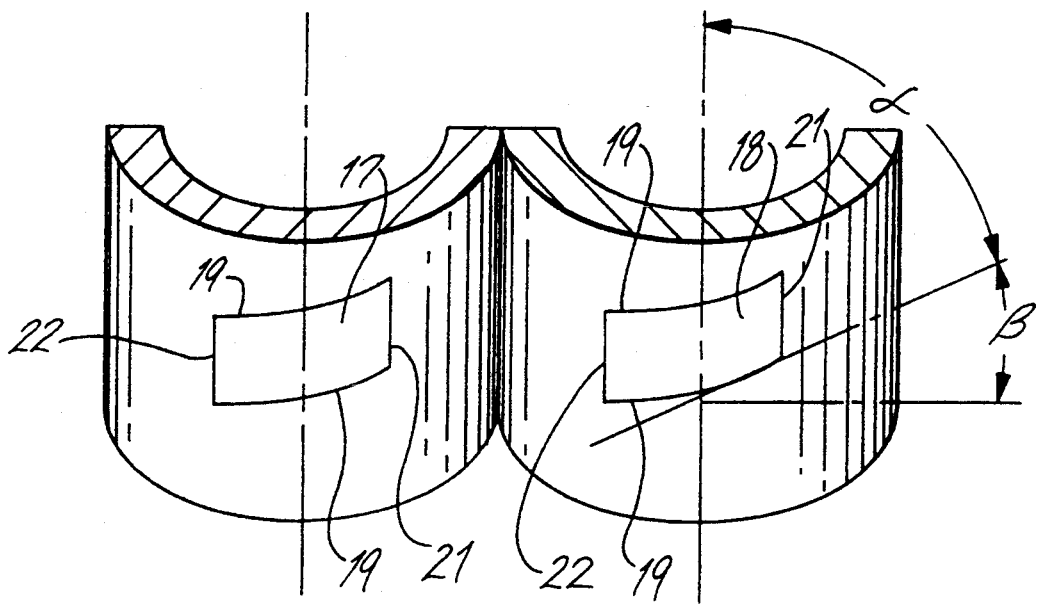
FIG. 2 illustrates schematically a portion of an internally threaded sleeve bolt having crimped die impressions formed therein, split and opened like a book for purposes of illustration.

FIG. 2 illustrates schematically a portion of an internally threaded sleeve bolt split in two for purposes of clarity for showing crimping die impressions 17 and 18 on diametrically opposite sides of the sleeve bolt. Each die impression has helically extending edges 19 and borders 21 extending in a direction parallel to the axis of the fastener. The curved edges 19 are formed at a helix angle $\alpha$ and lead angle $\beta$ equal to the helix angle $\alpha$ and lead angle $\beta$ of the bolt or internal thread of the sleeve bolt. The length of the die impressions, i.e., the distance between the edges 19, is selected to correspond to the number of internal thread profiles which are to be deformed to provide the desired torque range.

An exemplary prevailing torque fastener has a ¼–28 double lead thread. Each die impression has a lead angle $\beta$ of approximately 5.8° and a helix angle $\alpha$ of approximately 84.2°.

Figure 4:
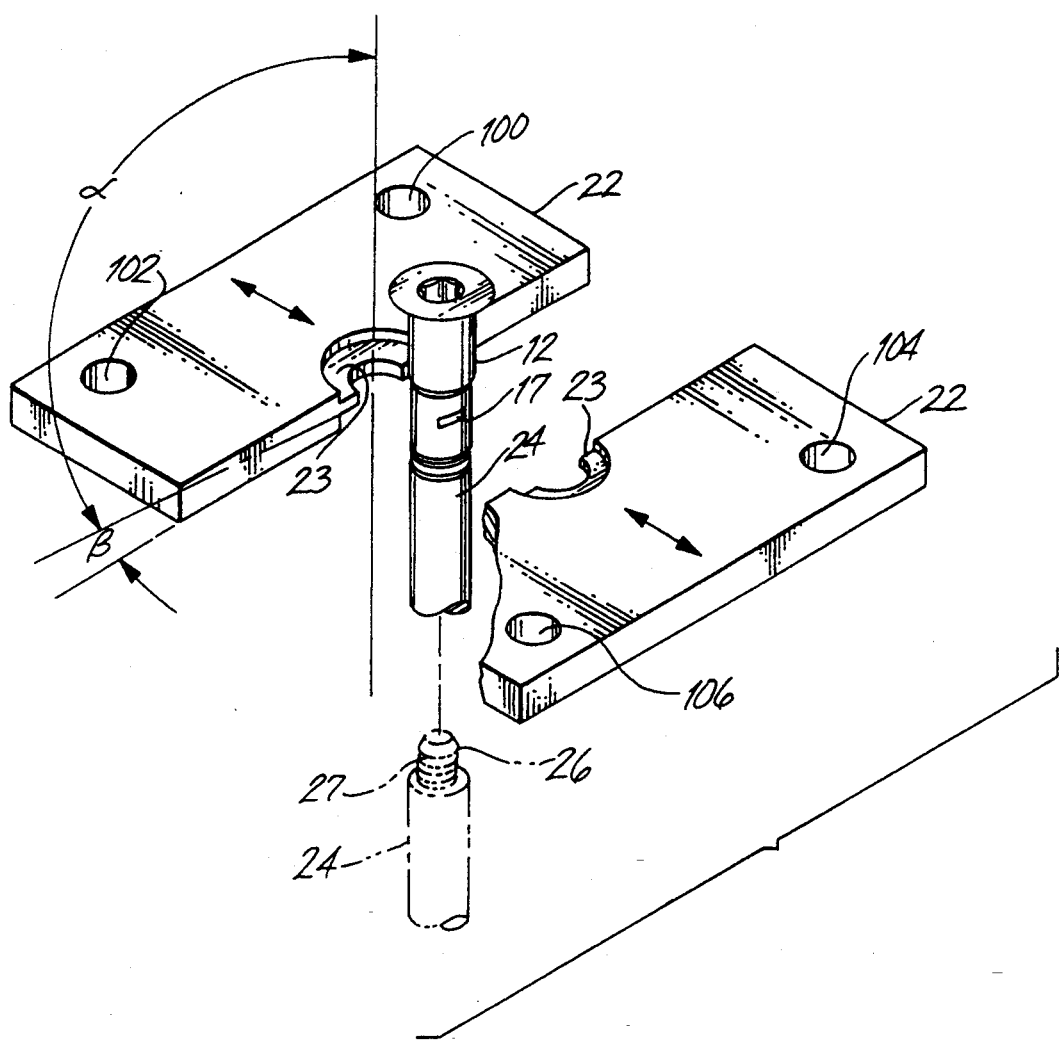
FIG. 4 is a semi-schematic isometric view of a crimping die used for making a sleeve bolt.

FIG. 4 illustrates in a fragmentary exploded isometric view a crimping die used for forming die impressions on a sleeve bolt 12 as provided in practice of this invention. A pair of die plates 22 are bolted to die holders (not shown) in a conventional crimping machine. The die plates are moved toward and away from each other as indicated by the double headed arrows for engaging diametrically opposite sides of the sleeve bolt. Each die plate has a recess containing an arcuate jaw 23. Each arcuate jaw is skewed from a plane normal to the axis of the sleeve bolt by an angle $\beta$ corresponding to the lead angle of the thread in the sleeve bolt. As will be apparent, when the die plates are closed against each other around a sleeve bolt, the arcuate jaws form the die impressions on the opposite sides of the sleeve bolt.

The crimping machine also has a stop pin 24 for holding one end of a fastener. In FIG. 4 the stop pin is illustrated in phantom exploded from its position holding a sleeve bolt between the die plates for showing the structure of the end of the pin. A short male threaded boss 26 extends from the end of the stop pin. When the apparatus is used, a fastener 12 is threaded onto the boss until the end of the fastener engages a shoulder 27 on the pin which acts as a stop preventing further rotation of the fastener.

When the cross-section of a fastener is deformed by the die impressions from a circular cross-section to an approximately elliptical cross-section, the thread is not only deformed radially inwardly, but the thread profile is also distorted. Published British patent specification 1,101,669 by Jones illustrates in FIG. 4, distortion of a thread in a fastener due to such crimping die impressions. In effect, in some portions of the thread, the thread profile is rotated or tilted.

For example, in a typical thread profile, the two flanks of the thread are at an angle of about 30° from a plane normal to the axis of the fastener. When a thread is deformed, the thread profile may be tilted seven or eight degrees so that one flank of the thread may be 23° from a plane normal to the axis and the other flank may be 37° from such a plane. The tilted thread contributes to tight engagement of the deformed thread with an undeformed thread when the fastener is assembled.

It has been found that when the die impressions follow a helical path corresponding to the lead angle of the thread, the thread distortion appears to be more uniform and the torque values have less variation from fastener to fastener, than when the die impressions are strictly circumferential. It has been found, however, that there are still random variations in torque, which may be larger than acceptable for high quality aerospace fasteners.

It is believed that this random variation in torque may be due to random location of the die impressions relative to the thread profile. In some fasteners, the edge of a die impression may be opposite the root of a thread inside the fastener. On another fastener, the edge of the die impression may be opposite the crest of the internal thread. Clearly, the edge of the die impression may be at any location therebetween. These variations are believed to lead to random variations in the prevailing torque. Thus, it is desirable to assure that the edge of the die impression is always directly opposite the same portion of the thread profile. This assures that the distortion of the thread is the same from one fastener to the next.

Control of the location of the die impression relative to the thread profile has been shown to reduce the random variations in torque previously found in threaded fasteners. It has been found to be particularly desirable that the edge of the die impression be directly opposite to the crest of the thread in the bore of the fastener. This places the edge of the die impression adjacent to the thickest portion of the wall of the fastener.

The alignment of the edges of both die impressions directly opposite the crest of the thread on opposite sides of the fastener is readily accomplished with a double lead thread as illustrated. If there is a single lead thread (or any odd number lead) and the dies are aligned with each other, the edge of one die impression would be opposite a thread crest and the edge of the other impression would be opposite a thread root. There are several solutions to this dilemma.

One may make die impressions that are one pitch or an integral multiple of the thread pitch with jaws that are aligned. The edges of both die impressions may be aligned with the middle of the flank of the thread to maintain symmetry of thread deformation. Alternatively, the jaws may be designed so that one jaw has a length of three pitch and the other jaw with one pitch. When the difference between the "length" of each jaw is one pitch length, both die impressions may have edges aligned with the same part of the thread profile, e.g. the thread crest. A similar result can be obtained by offsetting the two jaws by one half pitch from each other. With such an embodiment both die impressions may have edges aligned with the thread crest.

Predetermined location of the die impression relative to the thread profile is provided by the crimping apparatus illustrated in FIG. 4. When the fastener is threaded onto the boss 26 on the pin, it can rotate only until it reaches the shoulder. This predetermines the location of the thread in the fastener. Since the arcuate yaws are at a fixed distance from the end of the pin, the die impressions formed by the jaws are necessarily at a fixed location relative to the profile of the thread. The distance is easily adjusted so that the die impression is at any desired predetermined location on the thread profile, such as for example, being directly opposite the thread crest. This assures that the tilt of the thread profile in each fastener is the same as the tilt in each other fastener.

As has been mentioned above, one of the problems with previous prevailing torque fasteners is the wear that occurs on the surface as the fastener is reused. Such wear occurs when there is a high pressure contact between the male and female threads. A small area of contact between the threads leads to high pressure and accelerated wear. If one simply deforms a generally cylindrical fastener so that a portion of the internal thread has an elliptical cross-section, it will be apparent that such an ellipse engages a circular thread on a stud at essentially two diametrically opposite points. Such small area of contact promotes wear.

The arcuate jaws in the crimping apparatus are therefore made with a carefully predetermined curvature so that although the formed thread in the fastener is generally elliptical, the area of contact between the deformed thread and the undeformed thread subtends a substantial arc instead of being essentially a point contact. The increased area of contact reduces wear.

Figure 5:
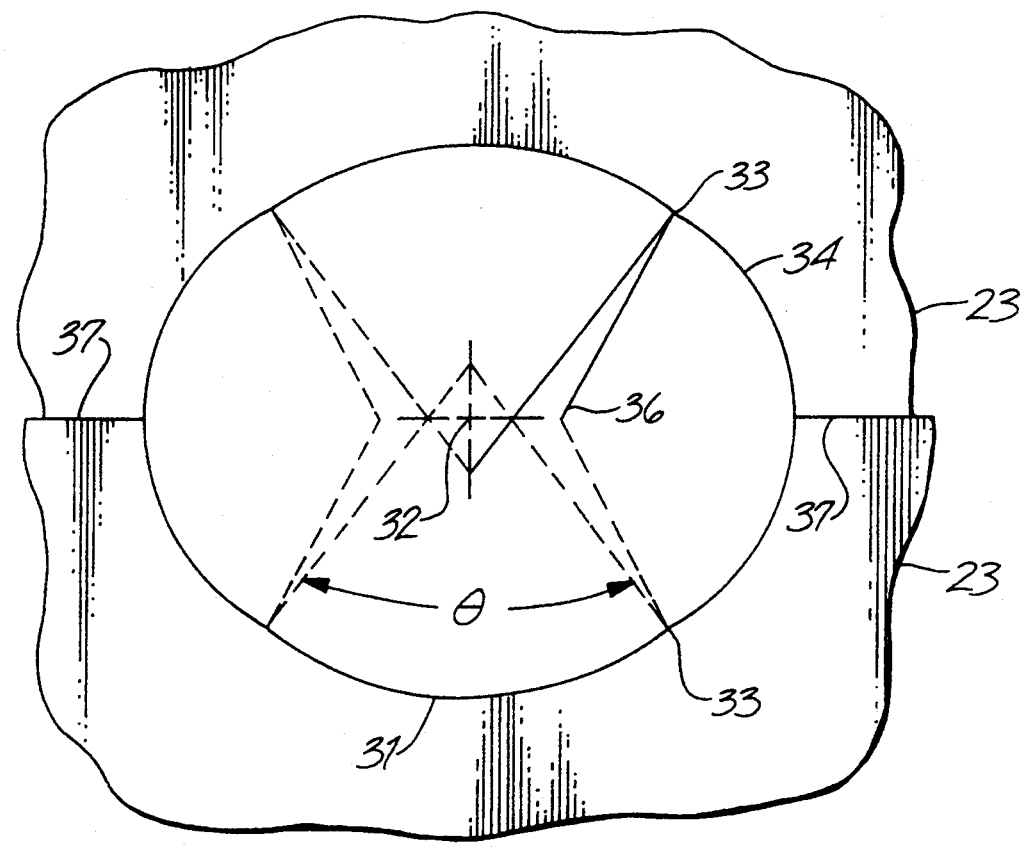
FIG. 5 illustrates an exemplary opening between crimping dies when engaged around a fastener.

FIG. 5 illustrates an exemplary pair of jaws 23 showing the geometry of the arcuate opening between the jaws when they are closed against each other. Each jaw has a central circular arc 31 which subtends an angle $\theta$ from the center of the arc. The radius of curvature $R_1$ of the circular arc 31 is greater than the outside radius of the fastener sleeve. The center of the arc is located beyond the center 32 of the opening between the jaws, i.e., the axis of a fastener (not shown) between the jaws. Thus, the circular arc subtends a larger angle from the axis of the fastener. For example, in one fastener having an outside diameter of 5.8 mm, a preferred angle $\theta$ is about 75° and the angle subtended by the circular arc from the axis of the fastener is a little less than 90°.

Preferably, the angle subtended by the circular arc from the center of the jaw opening or axis of the fastener is in the range of from 65° to 100°. If the angle is appreciably less than 65°, the area of contact between the deformed and undeformed threads is decreased and there may be enhanced wear. On the other hand, if the angle subtended is more than about 100°, the angle between the end borders of the two die impressions is reduced to less than about 80°. The remaining portion of the sleeve bolt between the die impressions may require too much force for opening the sleeve bolt when engaged with a male fastener. For very high torque values, the distance between the die impressions may be shorter. Preferably, the angle subtended by the circular arc 31 from the axis of the fastener is approximately 90°. With such an angle, about half of the deformed thread may be in engagement with undeformed thread and about half of the threads are not in engagement.

The shape of the opening of the dies between the ends 33 of the two circular arcs 31 is preferably also a circular arc 34. This circular arc has a radius of curvature $R_2$ less than the radius of the fastener. The center 36 of the smaller radius arc 34 is, therefore, between the center die opening and the arc. Thus, in the example mentioned above, the smaller radius arc subtends an angle of about 124° from its own center and an angle of about 90° from the center of the die opening (axis of the fastener).

It turns out that when the jaw openings are made as described, the points 33 at the ends of the circular arcs 31 are at a distance from the center 32 of the jaw opening approximately the same as the radius of the circular fastener. In other words, if a circle with the diameter of the fastener were superimposed on the drawing of FIG. 5, it would intersect the approximately elliptical figure at the four points 33.

The radius of the larger radius circular arc 31 in the center of each jaw opening is greater than the radius of the fastener deformed by the jaw. When a fastener is deformed by closing the jaws, as illustrated in FIG. 5, a portion of the deformation is plastic and a portion is elastic. When the jaws are opened for removing the fastener from the apparatus, the elastic portion of the deformation is released and the fastener springs back towards a circular cross-section.

The amount of springback due to the elastic portion of the deformation may be appreciable and should be taken into account when selecting a dimension of the jaw openings. For example, in a typical −6 fastener, the jaw openings may collapse the fastener as much as 0.5 mm on the diameter. When the jaws are opened, the fastener may spring back as much as 0.25 mm. Thus, the permanent deformation of a fastener may be about 0.25 mm on the diameter. The amount of permanent deformation may vary from batch to batch of fasteners due to tolerance variations.

Preferably, the larger radius circular arc 31 is just enough larger than the radius of the fastener to be deformed that after deformation, the die impressions on the fastener have a surface with approximately the same radius as the undeformed fastener. The die impressions are, however, closer to the axis of the fastener than the radius of the undeformed fastener. As a consequence, the deformed thread inside the fastener has an arcuate portion moved inwardly toward the axis of the fastener which retains approximately its original curvature.

It is desirable that when the deformed fastener springs back when released from the jaws, that the portion of the thread inside the fastener spanning the minor axis of the approximately elliptical cross-section has a radius approximately the same as the radius of the male thread with which the deformed thread is mated. When these two thread radii are similar, there is a large area contact between the threads instead of the point contact characterizing the prior art. The large area contact reduces the pressure and wear of the threads.

Preferably, the arc with the original radius subtended from the center of the fastener is in the range of from 65° to 100°. This corresponds to the range for the larger radius circular arc in the jaw opening used for making the die impressions. This gives a large area for contact between the male and female threads.

As used herein, the radius of the thread in the deformed portion and the radius of the die impression refer to the sleeve after a male threaded stud is threaded into the sleeve. When the deformed fastener comes out of the jaws, the thread is actually distorted to a diameter (e.g. pitch diameter) smaller than the diameter of the stud. The male and female threads are formed with a nominal clearance between them so that they can be assembled readily. In a typical −6 fastener, the nominal clearance on the diameter is about 0.15 mm, or about 75 micrometers on the radius.

When the sleeve is assembled on a stud, the stud deforms the sleeve back toward its undeformed state. Because of the tolerance between the stud and sleeve, the deformation does not return completely to its original dimensions.

Thus, when speaking of an arc of from 65° to 100° in the thread having the original radius, the meaning is approximate; the angle subtended is 65° to 100°, but the radius is actually close to the radius of the stud threaded into the sleeve. It is smaller than the radius of the undeformed thread by about the amount of the nominal tolerance between the parts.

Similarly, when stating that after deformation the die impressions on the fastener have a surface with approximately the same radius as the undeformed fastener, it is intended to refer to the radius after the sleeve is assembled on a stud.

It is desirable to obtain uniformity of deformation of the thread from one fastener to the next. Uniformity is enhanced when the opening between the jaws just accommodates the material of the fastener. Thus, the geometry of the circular arcs is selected so that the periphery of the opening between the jaws is equal to the circumference of the cylindrical fastener. Thus, when the jaw openings are closed on a fastener, diametrically opposite sides are collapsed towards the axis and the portions therebetween are bulged outwardly.

Since the periphery of the jaw opening equals the circumference of the fastener, the jaw opening is just filled and the exterior of the fasteners has a shape corresponding closely to the shape of the jaw opening (subject, of course, to the springback due to elastic deformation). Exactly filling the jaw opening promotes uniformity of deformation of the fasteners. The fastener is self centered in the jaw opening and therefore symmetrical.

Those familiar with manufacturing techniques for fasteners will recognize that certain manufacturing tolerances must be provided for machining the fasteners. Any fastener selected at random may have maximum dimensions within the tolerance band, whereas another may have minimum dimensions. It is desirable to provide deformation in the prevailing torque fastener that provides similar torque values regardless of whether the fastener is at min dimensions or max dimensions. The manufacturing technique provided in practice of this invention may be used for enhancing such uniformity.

In a practical manufacturing operation, a substantial number of fasteners may be machined in a batch with a given machine setup. Within that batch, all of the fasteners have substantially the same dimensions. For example, all of them may have a diameter slightly above the mid-point above the tolerance band. This uniformity within a batch of fasteners being manufactured can be utilized for obtaining uniformity of deformation and hence uniformity of torque values.

As has been described, the jaw opening preferably has a perimeter the same as the circumference of the circular fastener. If the jaws are made so that the opening has a perimeter for a fastener at the mid-point of the tolerance band, the opening between the jaws may not fill for a min dimension fastener and the jaws may not quite close if the fastener is at max dimensions.

A practical manufacturing technique is to therefore prepare a set of die plates with slightly different jaw openings. This is most readily done by grinding a very thin layer off of the parting face 37 of each of the jaws. It is preferable to take a small amount off of each die plates for maintaining symmetry. An exemplary set of die plates may comprise six pairs with the amounts removed from each jaw being 0, 5, 10, 15, 20, 25 and 30 micrometers, respectively.

One first takes a few fasteners from a batch and deforms them with one of the pairs of jaws in the set. The torque required for assembling the formed fastener is then measured to see how it compares with the specified torque. If the measured value is not as specified, a larger or smaller pair of die plates from the set, as appropriate, are used to deform a few more fasteners. One can thereby quickly identify the appropriate pair of die plates to use for a given batch of fasteners to obtain uniform torque values at precisely the desired value for the rest of the fasteners in the batch.

One other dimension has not been mentioned, namely, the distance between the edges 19 of a die impression. In the double lead thread described and illustrated, it is desirable that the distance between the edges of each die impression be equal to the pitch of one thread. In other words, if one edge of the die impression is opposite the crest of one thread 11, the other edge of the impression is along the crest of the same thread at its next turn around the fastener. The intervening thread 12 is thus centered opposite the die impression. When the fastener has a single lead thread, the distance between the edges of each die impression is preferably two or three times the pitch of the thread. Anywhere from one to four times the pitch of the thread appears suitable.

When a prevailing torque fastener as described is threaded onto a threaded stud 10, it initially threads freely. When the leading threads of the male fastener reach the portion of the internal threads of the sleeve bolt which are deformed by the die impressions, continued threading causes the deformable section to deform back towards the original circular shape. The resulting friction between the mating threads serves to lock the sleeve bolt in place.

An exemplary fastener is a nominal ¼-inch fastener having a double lead −28 thread (i.e., 28 thread turns per inch). Such a fastener employed a steel pin with a conventional molybdenum disulfide surface coating. A cadmium plated alloy steel sleeve bolt deformed with die impressions as a prevailing torque fastener as hereinabove described was threaded on and off of the pin for 500 cycles without deviating from the torque specification.

While the invention has been described with reference to its preferred embodiments, it will be understood by those skilled in the art that various changes may be made and equivalents may be substituted for elements thereof without departing from the true spirit and scope of the invention. For example, the crimping impressions can be used with any internally threaded self-locking device, including an internally threaded nut or the sleeve bolt described hereinabove. The fasteners may be made of any desired material and it will be apparent that the relative dimensions of the parts may be adjusted as required to obtain a desired range of torque values. Thus, within the scope of the appended claims, this invention may be practiced otherwise than as specifically described.

What is claimed is:

1. A method for making a prevailing torque fastener comprising the steps of:
    forming a cylindrical hole in a fastener body;
    forming a female thread in the hole;
    threading the fastener body onto a male thread until an end of the body engages a stop which determines the angular position of the thread in a crimping apparatus; and
    crimping a portion of an exterior surface of the body with a pair of dies for forming a generally elliptical cross section in a portion of the thread, each crimping die comprising an arcuate jaw having upper and lower edges skewed from a plane normal to the axis of the hole at an angle equal to the lead of the thread, the edges of each crimping die each having a fixed elevation relative to the stop.

2. A method as recited in claim 1 wherein the crimping step comprises crimping the body with a crimping die having a circular arc with a radius greater than the radius of the exterior of the undeformed body, and wherein the crimping dies are closed so that the distance between the centers of the circular arcs is less than the diameter of the undeformed body.

3. A method as recited in claim 1 wherein an edge of each die impression is directly opposite a crest of the thread in the bore adjacent to the die impression.

4. A method for making a prevailing torque fastener comprising the steps of:
   forming a cylindrical hole in a fastener body;
   forming a female thread in the hole;
   crimping a portion of an exterior surface of the body with a pair of dies by closing the dies against each other for forming a generally elliptical cross section in a portion of the thread, each crimping die comprising an arcuate jaw having a central circular arc with a radius greater than the radius of the undeformed body, the total perimeter of each arcuate jaw being equal to one half of the circumference of the undeformed body.

5. A method as recited in claim 4 wherein each arcuate jaw has upper and lower edges skewed from a plane normal to the axis of the hole at an angle equal to the lead of the thread.

6. A method as recited in claim 4 wherein each arcuate jaw has an edge directly opposite a crest of the thread in the bore adjacent to the jaw.

7. A method for making a prevailing torque fastener comprising the steps of:
   forming a cylindrical hole in a fastener body;
   forming a female thread in the hole;
   crimping a portion of an exterior surface of the body with a pair of crimping dies for forming die impressions in diametrically opposite sides of the external surface of the body and a generally elliptical cross section in a portion of the thread, each die impression having upper and lower edges skewed from a plane normal to the axis of the hole at an angle equal to the lead of the thread, each die impression comprising a circular arc extending circumferentially around the body through an angle in the range of from 65 to 100 degrees.

8. A method as recited in claim 7 comprising the step of orienting the thread in the hole at a predetermined elevation relative to the crimping dies.

9. A method as recited in claim 8 wherein the thread is oriented with a crest of the thread directly opposite an edge of each crimping die.

10. A method as recited in claim 8 wherein the step of orienting comprises threading the fastener body onto a male thread until an end of the body engages a stop.

* * * * *